United States Patent
Markowitz et al.

(10) Patent No.: US 10,326,642 B2
(45) Date of Patent: Jun. 18, 2019

(54) INTELLIGENT MONITORING AND MANAGEMENT OF NETWORK DEVICES

(71) Applicant: 3MD, Inc., Redmond, WA (US)

(72) Inventors: Gabe Markowitz, Redmond, WA (US); Terry Matthews, Redmond, WA (US)

(73) Assignee: 3MD, Inc., Redmond, WA (US)

( * ) Notice: Subject to any disclaimer, the term of this patent is extended or adjusted under 35 U.S.C. 154(b) by 0 days.

(21) Appl. No.: 15/128,956

(22) PCT Filed: Mar. 25, 2015

(86) PCT No.: PCT/US2015/022543
§ 371 (c)(1),
(2) Date: Sep. 23, 2016

(87) PCT Pub. No.: WO2015/148705
PCT Pub. Date: Oct. 1, 2015

(65) Prior Publication Data
US 2017/0180192 A1    Jun. 22, 2017

Related U.S. Application Data
(60) Provisional application No. 61/970,318, filed on Mar. 25, 2014.

(51) Int. Cl.
| G06F 15/173 | (2006.01) |
| H04L 12/24 | (2006.01) |
| H04L 29/08 | (2006.01) |
| G08B 29/04 | (2006.01) |

(52) U.S. Cl.
CPC ......... *H04L 41/0677* (2013.01); *G08B 29/04* (2013.01); *H04L 41/0213* (2013.01); *H04L 67/125* (2013.01); *H04L 67/303* (2013.01)

(58) Field of Classification Search
CPC ................. H04L 41/0677; H04L 41/0213
See application file for complete search history.

(56) References Cited

U.S. PATENT DOCUMENTS

| | | | |
|---|---|---|---|
| 8,121,958 B2* | 2/2012 | Motoyama | G06F 3/1218 358/1.15 |
| 2003/0037130 A1* | 2/2003 | Rollins | H04L 12/24 709/223 |
| 2004/0205207 A1* | 10/2004 | Motoyama | H04L 29/06 709/230 |
| 2007/0086052 A1* | 4/2007 | Furuya | H04L 67/16 358/1.15 |
| 2009/0077215 A1* | 3/2009 | Jayanthi | G06F 15/177 709/223 |
| 2012/0197484 A1* | 8/2012 | Nath | G01S 5/0072 701/32.4 |
| 2013/0294306 A1* | 11/2013 | Borges | H04W 76/02 370/311 |
| 2014/0162688 A1* | 6/2014 | Edge | H04W 8/005 455/456.1 |
| 2015/0044975 A1* | 2/2015 | Lamb | H04M 1/00 455/67.14 |

(Continued)

FOREIGN PATENT DOCUMENTS

JP    2007183889 A   *   7/2007

*Primary Examiner* — Jonathan A Bui

(57) ABSTRACT

Technologies and implementations for facilitating monitoring and management of network devices are generally disclosed.

20 Claims, 9 Drawing Sheets

(56) References Cited

U.S. PATENT DOCUMENTS

2015/0087231 A1\* 3/2015 Sinha ................ H04W 4/008
  455/41.2
2015/0288464 A1\* 10/2015 Tanner ................ H04B 17/15
  455/41.1

\* cited by examiner

800 A computer program product

802 A signal bearing medium 804 at least one of a non-transitory machine readable medium having stored therein instructions that, when executed by one or more processors, operatively enable a computing device to:

receive indication of a networked device;

determine capabilities of the received indication of the networked device; and facilitate monitoring and management of the network devices based, at least in part, on the determined capabilities.

| 806 a computer-readable medium | 808 a recordable medium | 810 a communications medium |

Figure 8

INTELLIGENT MONITORING AND MANAGEMENT OF NETWORK DEVICES

RELATED APPLICATION

This application is based upon and claims the benefit of priority to prior PCT International Patent Application No. PCT/US15/22543 titled Intelligent Monitoring and Management of Network Devices, filed on Mar. 25, 2015, which in turn, is based upon and claims the benefit of priority to U.S. Provisional Patent Application Ser. No. 61/970,318 titled Intelligent Monitoring and Management of Network Devices, filed on Mar. 25, 2014. Both, the PCT International Patent Application No. PCT/US15/22543 and the U.S. Provisional Patent Application Ser. No. 61/970,318, are incorporated herein in their entirety.

INFORMATION

Unless otherwise indicated herein, the approaches described in this section are not prior art to the claims in this application and are not admitted to be prior art by inclusion in this section.

Network devices have become prevalent in the world. Network devices may include a wide range of devices such as, but not limited to, surveillance cameras, security keypads, keycard locks, access badge scanners/readers, etc. Because of the sheer number of variety of network devices and their locations, which can span locally to internationally, monitoring and management of the network devices may be difficult.

SUMMARY

Described herein are various illustrative methods for facilitating monitoring and management of network devices. Example methods may include receiving an indication of a network device, determining capabilities of the network device, and facilitating monitoring and management of the network device based, at least in part, on the determined capabilities.

The present disclosure also describes various example article of manufacture having a non-transitory machine readable medium having stored therein a number of instructions that, when executed by a processors, operatively enable a computing device to receive an indication of a network device, determine capabilities of the network device, and facilitate monitoring and management of the network device based, at least in part, on the determined capabilities.

The present disclosure additionally describes example systems. Example systems may include a network, a network device communicatively coupled to the network, the network device configured to support a simple network management protocol (SNMP), a processor communicatively coupled to the network, a network device monitoring and management module communicatively coupled to the processor and the network, and a non-transitory machine readable medium having stored therein a number of instructions. The number of instruction, which, if executed by the processor, operatively enable a computing device to receive an receive an indication of a network device, determine capabilities of the network device, and facilitate monitoring and management of the network device based, at least in part, on the determined capabilities.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 8 illustrates an example computer program product 800, arranged in accordance with at least some embodiments described herein.

DETAILED DESCRIPTION

Figure 1:
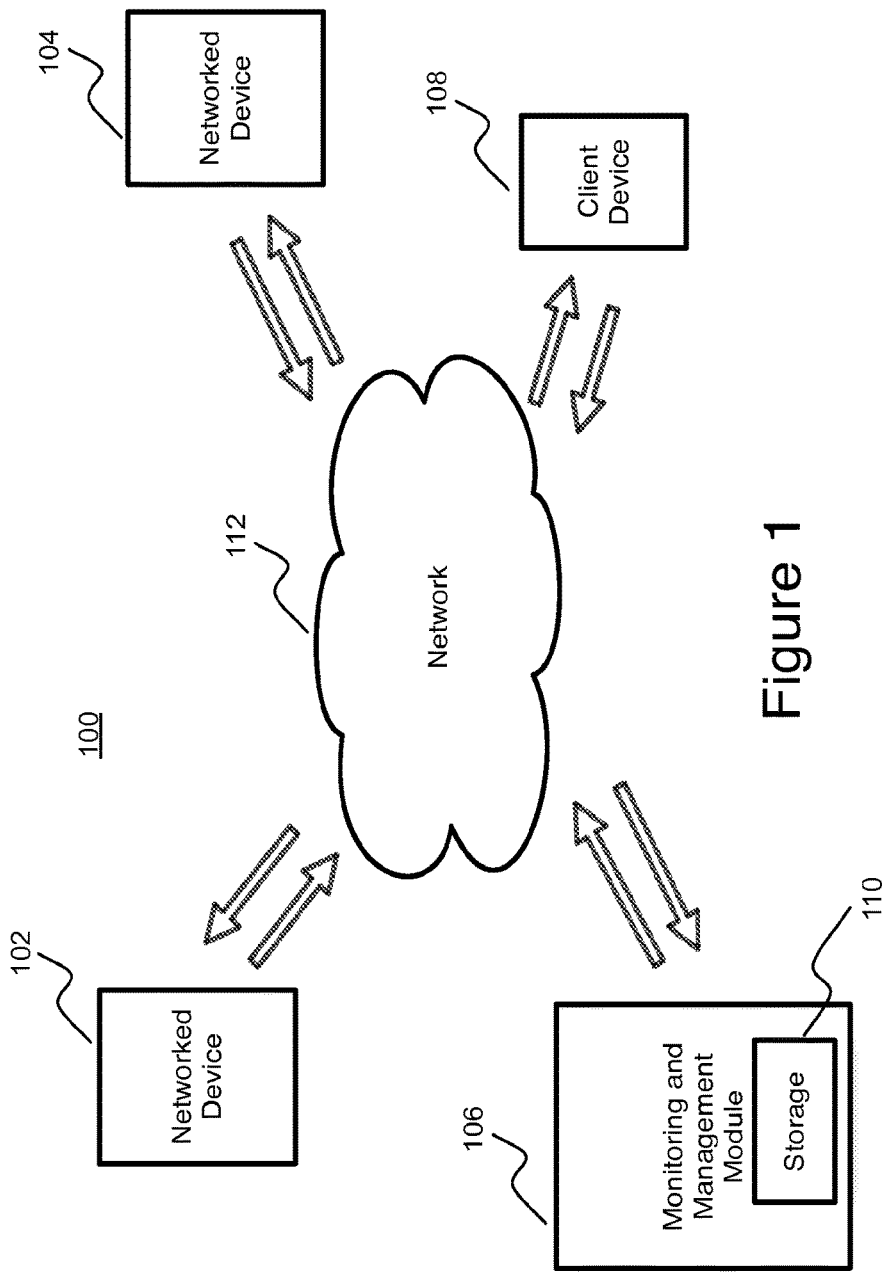
FIG. 1 illustrates an example system for monitoring and management of network devices, in accordance with various embodiments.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, and systems related to facilitate monitoring and management of network devices.

Network devices have become common for various reasons such as, but not limited to, security. Some examples of network devices may include surveillance cameras, security keypads, keycard locks, access badge scanners/readers, etc. Even for a single establishment such as, but not limited to, a business, there could be numerous network devices. In addition to being numerous, network devices may be located anywhere. For a non-limiting example, a single business may have numerous network surveillance cameras in locations throughout the world. The surveillance cameras may not all be alike as well. Accordingly, monitoring and management of the surveillance cameras may be relatively difficult.

There may be several reasons for monitoring and management of a network device. At least one reason for monitoring and management of a network device may be to establish a connection with a device, which may be newly communicatively coupled to a network. At least another reason may be for monitoring and management of a network device may be to determine if the device is functioning properly. At least a further reason for monitoring and management of a network device may be to facilitate self-maintenance of the device. However, because network devices may be numerous and located in multiple location through the world, monitoring and management of network devices may be difficult.

Monitoring and management of network devices may include information such as, but not limited to, detection of a network device's (e.g., irrespective of its location, manufacture, capabilities, etc.) functionality (e.g., working properly). For example, activity of a network device (e.g., received data from the device seems to indicate a prolonged period of inactivity, which may lead to some form of suspicion), and so forth. If it is determined that analytics seem to indicate some functionality issues with the network device, the network device may be flagged for an alert and/or at least an inquiry.

In a non-limiting example, monitoring and management of network devices may include determining if data from a network device is static. For example, if a network device such as, but not limited to, a surveillance camera has an obstacle obscuring it view (e.g., a tree, some debris, a covering, masking tape, etc.), as part of the monitoring and management, a determination may be made that the data from the network device seems to indicate static activity. The network device may be flagged for an alert and/or at least further investigation/inquiry.

As part of the investigation/inquiry, it is contemplated within the scope of the claimed subject matter that monitoring and management of network devices may include intelligent and/or artificial intelligence type monitoring and management. For example, if a network device is flagged for an alert and/or at least further investigation and/or inquiry, monitoring and management of network devices may include determining a network device in proximity to the flagged network device. If a network device is determined to be in proximity to the flagged network device, determination of capabilities of the proximity network device may be utilized. Continuing with the example of a surveillance camera above, a second surveillance camera in proximity to the flagged surveillance camera may be utilized manually and/or automatically to at least view the flagged surveillance camera. Based at least in part on the capabilities of the second surveillance camera, the flagged surveillance camera may be at least diagnosed and/or repaired. For example, the second surveillance camera may capture images that the flagged surveillance camera has an obstruction on top of the surveillance camera. In another example, the second surveillance camera may have the capabilities to help facilitate repair of the flagged surveillance camera such as, but not limited to, various appendages attached to the second surveillance camera to facilitate removal of the obstruction.

At this point, it should be noted that even though the above examples may be described in terms of a network device being a surveillance camera, it is contemplated within the scope of the claimed subject matter that the network device having the above described capabilities may include a wide range of network devices such as, but not limited to, security keypads, keycard locks, access badge scanners/readers, etc., and accordingly, the claimed subject matter is not limited in these respects.

It should be pointed out that the use of the term "flag" is generic as an indicator of some kind such as, but not limited to a visual indication, an electronic indication, an analog indication (e.g., sound), a digital indication, database structure indication, register indication, etc., and accordingly, the claimed subject matter is not limited in these respects.

FIG. 1 illustrates an example system for monitoring and management of network devices, in accordance with various embodiments. Shown in FIG. 1, a system 100 may comprise of first network device (hereon out, ND) 102 and a second ND 104. Additionally, the system 100 may include a monitoring and management of network device module 106 (hereon out, module) and a client device 108. The module 106 may include a storage 110. As shown, the first ND 102, the second ND 104, the module 106, and the client device 108 may all be communicatively coupled to a network 112. Accordingly, the first ND 102, the second ND 104, the module 106, and the client device 108 may all be communicatively coupled with each other via the network 112.

The first ND 102 and the second ND 104 may be shown and referred to as various forms of network devices such as, but not limited to, surveillance cameras, security keypads, keycard locks, access badge scanners/readers, etc. computing devices (e.g., desktop computing devices, handheld computing devices, tablets, smart phones, wearable smart devices including glasses, clothing, and the like), various video devices including digital or analog based video devices, etc., and any combination thereof. In order to describe the disclosed subject matter, the first ND 102 may be referred to as a first video device 102 and the second ND 104 may be referred to as a second video device 104. As will be described, the first video device 102 and the second video device 104 may be located in any location. For example, the first video device 102 may be located in one part of an establishment, while the second video device 104 may be located in a second part of the establishment. In another example, the first video device 102 may be located in a first city, while the second video device 104 may be located in a second city. Accordingly, the first video device 102 and the second video device 104 may be located in any location. Additionally, the first and second video devices 102 & 104 may be a wide variety of video devices such as, but not limited to, analog type video cameras, video devices utilizing charge-coupled devices (CCD), video devices utilizing complementary metal-oxide semiconductor (CMOS), etc., and any combination thereof.

The module 106 may be a wide variety computer program products, which may be included in a wide variety of computing devices such as, but not limited to desktop computing devices, server type computing devices handheld computing devices, tablets, smart phones, wearable smart devices, etc., and any combination thereof. In FIG. 1, storage 110 may help facilitate storage of information associated with a network device (e.g., the first and/or second video devices 102 & 104). Additionally, storage 110 may include machine readable instructions. As shown in FIG. 1, module 106 may include storage 110. However, it should be appreciated that module 106 and storage 110 may be communicatively coupled in a wide variety of manners such as, but not limited to, being located in separate locations communicatively coupled via the network 112 in a ubiquitous computing (ubicomp) type of system, cloud computing type system, wide area local area network (WLAN), local area network (LAN), etc., and any combination thereof. Some of these examples may be described in detail later. Additionally, storage 112 may be a wide variety of storage such as, but not limited to, mechanical, optical, electrical, etc., and any combination thereof including some further examples described herein.

The client device 108 may be a wide variety of client type devices such as, but not limited to, registers, kiosks, computing devices (e.g., desktop computing devices, handheld computing devices, tables, smart phones, wearable smart devices including glasses, clothing, and the like), etc., and any combination thereof. In FIG. 1, the module 106 and the client device 108 may be shown as communicatively coupled via the network 112. However, it should be appreciated that the module and client device 108 may be communicatively coupled in a wide variety of manners such as, but not limited to, communicatively coupled as a single computing device, as a ubicomp system, a cloud system, etc., and any combination thereof.

As may be appreciated, the network 112 may be a wide variety of networks such as, but not limited to, wireless network, wired network, ubicomp network, cloud network, WLAN, LAN, world wide web, Internet, etc., and any combination thereof. The network 112 may help facilitate communication between all sorts of communication capable devices, where the communication may be in any form such as, but not limited to, electrical, optical, digital, analog, neural, organic, etc., and any combination thereof.

For example, in a cloud based network, the module 106 may be configured to be capable of being hosted on various cloud based methodologies such as, but not limited to, software as a service (SAAS) methodology, platform as a service (PAAS) methodology, infrastructure as a service (IAAS) methodology, and/or any combination thereof. Some example network devices may include network storage devices such as, but not limited to, storage area network (SAN) storage devices, network attached storage (NAS) devices, power on Ethernet (POE) switch devices, Internet protocol (IP) based security type network devices (e.g., surveillance cameras, security badge readers, various communication devices), and/or any combination thereof.

In a non-limiting example, module 106 may include a system center solution, which may be utilized to monitor and manage the connectivity and status of network devices such as, but not limited to, security cameras and a wide variety of network devices. In another example, module 106 may include an incident management type system, which may be utilized to track work requests created using automation triggered by the monitored and managed devices.

In some examples, network devices capable of supporting simple network management protocol (SNMP) devices may be monitored and managed. Additionally, as part of the monitoring and management of network devices, it is contemplated within the scope of the claimed subject matter that a wide variety of monitoring and management of network devices may be facilitated such as, but not limited to, asset management, predictive failure, information technology (IT) automation, network devices self monitoring and management (e.g., intelligent and/or artificial intelligence based monitoring and management of network devices), etc.

It should be appreciated that the examples disclosed in the disclosure are examples only, and accordingly, it is contemplated within the disclosed subject matter that the configurations, components, and/or implementations may include a wide variety of configurations, components, and/or implantations. Examples may include configurations, components, and/or implementations such as, but not limited to, Windows based operating system by Microsoft Corporation of Redmond, Wash., Mac OS (including iOS) based operating system by Apple Inc. of Cupertino, Calif., Linux based operating system, Android based operating system by Google Inc. of Menlo Park, Calif., wide variety programming languages (e.g., C, C++, C#, LINQ, and so forth) including web based languages (e.g., HyperText Markup Language (HTML), Extensible Markup Language (XML), Perl, Lisp, and so forth), etc., and accordingly, the claimed subject matter is not limited in these respects.

In one example, an environment, in which the disclosed subject matter may be utilized, may include system center operations manager (SCOM) module capable of being configured to monitor and manage network devices, such as, but not limited to, security camera and recording software and/or applications. The example environment may include a system center service manager (SCSM) module capable of being configured to automate generation of an incident alert from the SCOM module. The network device may include network devices capable of supporting simple network management protocol (SNMP). The SCOM may have the capabilities of managing data such as, but not limited to, recording data from the network device. For example, the SCOM may facilitate generation of an alert if a network device is experiencing an issue such as, but not limited to, not functioning properly (e.g., not recording). As described previously, the SCOM may facilitate automated addressing of the issue (i.e., monitoring and management may include self healing and/or repair).

Continuing with the non-limiting example of an SCOM module, some further examples, may be described. In one example, an SCOM module may be capable of being configured to monitor network devices utilizing an SNMP protocol. The SCOM may be configured to monitor and manage for various lengths of time for various network devices such as, but not limited to, surveillance cameras. The SCOM may be capable of automatically detecting and/or configuring various network devices. In one example, the SCOM may be capable of monitoring and managing data storage associated with the network device such as, but not limited to, recording software/application. Monitoring and managing storage associated with network devices may include monitoring and managing storage space on various servers associated with the network device, and accordingly, if storage space becomes an issue (e.g., falls below some percentage), SCOM may be capable of generating an indication of some kind such as, but not limited to, an alert. Alternatively, alternative available storage may detected and utilized facilitating addressing the potential issue such as, but not limited to, the storage space being an issue. In another example, the SCOM may be capable of monitoring and managing server database partitions for available storage space, if storage space becomes an issue (e.g., falls below some percentage), including generating an indication of some kind such as, but not limited to, an alert.

In another example, an SCOM may be configured to generate an alert if a network device is not available. In another example, an SCOM may be configured to provide a user interface to facilitate viewing, monitoring, and management of SNMP supported network devices.

Various security related methodologies may be implemented within the spirit and scope of the disclosed subject matter such as, but not limited to, an SCOM may be configured to facilitate administrative control over various network devices.

In another example, a gateway type server may be utilized along with data recording software/application server to help facilitate communication with network devices such as, but not limited to, surveillance cameras. In this example, if following SNMP protocol, discovery or gateway fails to establish communication with a network device, an agent type facilitator may be utilized to help facilitate communication with the network device.

In another example, an SCOM may be capable of being configured to generate reports related to the monitoring and management of network devices. These reports may include information such as, but not limited to, a network device run and/or down time, a network device model, a network device manufacturer, a network device location, etc.

In one example of an SCSM, an SCSM may be capable of being configured to facilitate interaction with a user via methodologies such as, but not limited to, user web based type portals, work flow notifications, issue resolution management, administrative management and/or access, network device information capabilities, various user interface methodologies, etc.

It should be appreciated that a wide range of hardware implementations may be utilized to realize the spirit and scope of the claimed subject matter. One non-limiting example hardware/software configuration may include the following: a service manager database, a service manager management server, a service manager console, a data warehouse management server, data warehouse databases, and a self-service portal such as, but not limited to, web content server with web components.

Another non-limiting example hardware/software configuration may include the following: an operations manager management server, an operations database server, a resource pool of servers configured to be capable of monitoring and managing network devices, and a data warehouse server, which may be configured to be capable of providing web console services and reporting services.

In yet another non-limiting example hardware/software configuration may include the following: a management server, a server configured to be capable of runbook design, a server configured to be capable of orchestrating web services, and a server configured to be capable of being a runbook server.

Another non-limiting example hardware/software configuration may include the following: a service manager management server, a data warehouse management server, a service manager or data warehouse database, a service manager console, a web content server configured to be capable of providing a self-service portal, various software/applications related to facilitating access via the self-service portal, and various client devices configured to be capable of accessing via the self-service portal.

In yet another non-limiting example hardware/software configuration may include the following: an operations manager management server, an operations database server, an operations manager data warehouse, an operations manager gateway server, an operations manager reporting system, a web console server, a monitoring agent configured to be capable of monitoring various communications between client devices and servers, an operations manager agent, and an operations console.

In another non-limiting example, hardware/software configuration may include the following: a management server, a server configured to be capable of orchestrating web services, and a server configured to be capable of being a runbook designer, and a server configured to be capable of being a runbook server.

As evident in the above examples, a wide variety of configurations, components, implementations, and/or methodologies may be utilized to monitor and manage a wide variety of network devices in accordance with various embodiments, and accordingly, the claimed subject matter is not limited in these respects.

Setup, configure and test the use of one non-limiting example implementation including System Center Operations Manager 2012 R2 (SCOM), System Center Service Manager 2012 R2 (SCSM) and System Center Orchestrator 2012 R2 (SCO) modules available from Microsoft Corporation, Redmond, Wash. to create a solution to facilitate monitoring and management of devices including determining the overall capabilities of the devices.

Some example implementation may utilize the various System Center products in a variety of ways. In one example, SCOM may be utilized for monitoring of network devices such as, but not limited to, network devices that may support Simple Network Management Protocol (SNMP devices), recording engine type devices, intrusion panel type devices (e.g., Bosch intrusion panel available from Bosch, GmbH of Stuttgart, Germany, access control panel type devices (e.g., Mercury access control panel available from Mercury Security of Long Beach, Calif.), intercom master type devices, remote station type devices (e.g., Stentofon security intercom systems available from Zenitel Group of Belgium, Storage Area Network (SAN) type devices (e.g., Dell EqualLogic arrays available from Dell of Round Rock, Tex.), and power supply type devices (e.g., Altronix Power supplies available from Altronix of Brooklyn, N.Y.).

In another example, SCSM may be utilized to facilitate repair of down or broken devices by using automated workflows to at least assign incidents to analysts for repair, track the lifecycle of a device, allow for end users to place self-service requests for camera footage, reporting, etc.

A non-limiting environment, where the current one or more embodiments of the disclosed subject matter may be implemented may include a number of network devices. Continuing with the non-limiting example of a security network, the security network may include a number of network devices such as but not limited to, security devices. The number of security devices may be numerous (e.g., approximately 20,000 security devices) including 1500 servers worldwide. Of the numerous devices there may be approximately 200 unique camera models from approximately 9 different manufactures. The numerous security devices may include among a variety of security devices including image capture capable devices such as, but not limited to surveillance cameras.

The surveillance cameras and security devices may be managed by a variety of applications/modules such as, but not limited to, applications available from Lenel United Technologies of Pittsford, N.Y., Genetec, Inc. of Montreal, Quebec, Canada, from Milestone Systems A/S of Brondby, Denmark, etc.

Accordingly, in the above non-limiting example, there may be approximately 20,000 SNMP devices and 1500 network video recording servers to be monitored and managed.

An example arrangement of the above environment may include the Lenel based environment comprising of approximately 1500 network video recording servers managing approximately 16,000 security cameras (i.e., surveillance cameras). The example environment may also utilize 500 intrusion panels from Bosch, 500 Access Control Panels from Mercury, 5 Zenitel Exchange, 1000 Zenitel Intercom stations, and 20 Dell EqualLogic Storage Arrays.

In another non-limiting example arrangement of the above environment may include a Genetec based environment comprising of approximately 100 network video recording servers managing approximately 1500 security cameras.

In yet another non-limiting example arrangement of the above environment may include Milestone based environment comprising of approximately 100 network video recording servers managing approximately 1500 security cameras.

Each of the recording servers may be configured with a connection (i.e., communicatively coupled) to a private camera network and/or a connection to an entity production network, such as, but not limited to, a Microsoft production network.

It is contemplated within the scope of the present disclosure that the disclosed subject matter may include any number of network devices. For example, a network such as, but not limited to, a security related network may utilize a large SCOM type environment, for example, of approximately 65 servers in a highly available configuration for monitoring and management of security devices including recording servers for improved accurate reporting and alerting of network devices, such as, but not limited to surveillance cameras and their recording status.

Continuing with the non-limiting example of an intergraded SCSM and SCO environment setup may include any number of devices and configurations, such as, but not limited to, a highly available configuration of 20 servers may be used for automatic creation and assignment of incidents for resolution including reporting.

In the example of the SCOM environment, the environment may include approximately 3 management groups, where each management group may manage approximately 1,000 network devices (e.g., server type devices including those having the Windows based operating system available from Microsoft Corporation of Redmond, Wash.) and approximately 10,000 other network devices (e.g., security related devices such as surveillance cameras). In one example, each management group may include approximately 2 management type servers, and 5 resource type pools managing approximately 2,000 network devices per pool having approximately 3 management type servers per resource pool.

In another example, the environment may be a Lenel based environment. In the non-limiting example of a Lenel based environment, the environment may utilize an operations manager, which may be utilized for monitoring and management of approximately 16,000 network devices, such as, but not limited to cameras, approximately 1500 server type devices, including associated intrusion type panels, access type control panels, intercom type master stations, Stentofon type remote workstations, Dell storage arrays, and Altronix type power supplies.

Continuing with the non-limiting example of the Lenel based environment, a management type pack and/or agent type may be implemented to capture and alert on camera recording information including monitoring and managing the health of the Lenel based management system.

In yet another example, the environment may be a Genetec based environment. In the non-limiting example of a Genetec based environment, the environment may utilize an operations type manager, which may be utilized for monitoring and management of approximately 100 network devices such as, but not limited to, surveillance cameras and may include 50 network video recording servers. Continuing with the non-limiting example of the Genetec based environment, a management type pack and/or agent type may be implemented to facilitate monitoring and managing the health of the Genetec application.

In yet a further example, the environment may be a Milestone based environment. In the non-limiting example of a Milestone based environment, the environment may utilize an operations type manager for monitoring and management of approximately 1600 network devices such as, but not limited to, surveillance cameras including approximately 2001 server type devices. Continuing with the non-limiting example of the Milestone based environment, a management type pack and/or agent type may be utilized for monitoring and managing the health of the Milestone application.

Figure 2:
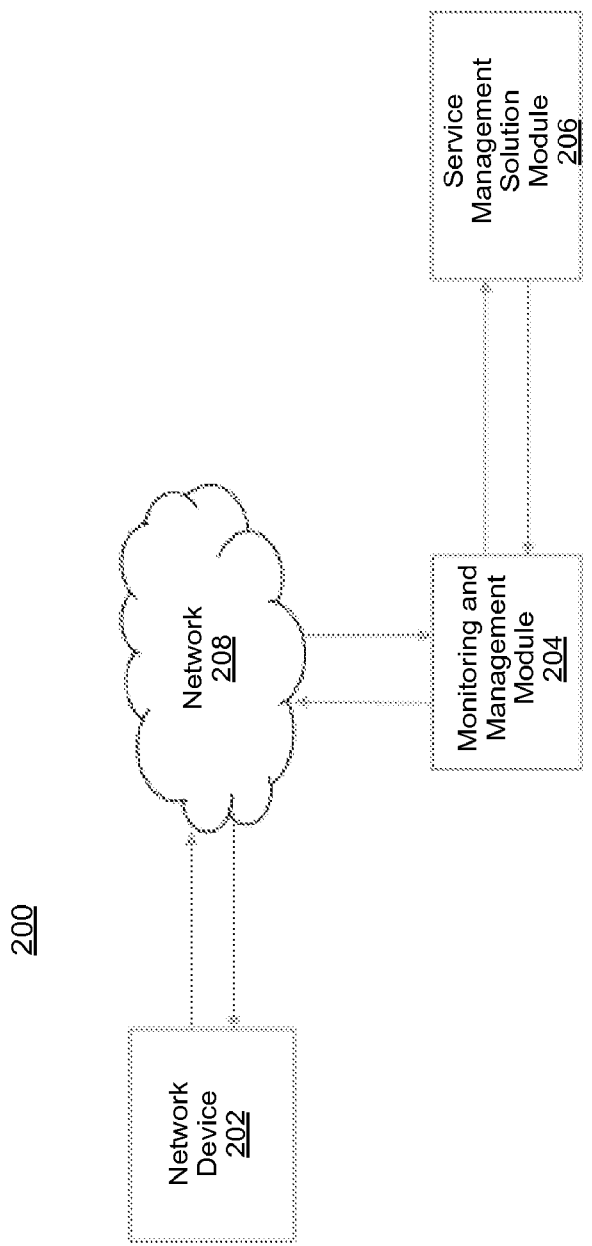
FIG. 2 illustrates an example system in accordance with various embodiments.

FIG. 2 illustrates an example system in accordance with various embodiments. In FIG. 2, a system 200 may include a network device 202, a monitoring and management (MM) module 204, and a service management solution (SMS) module 206. The network device 202, the MM module 204, and the SMS module 206 may be communicatively coupled to each other via a network 208.

In the example of FIG. 2, the network device 202 may be an SNMP protocol IP surveillance camera. The MM module 204 may be configured to be capable of registering, monitoring, and/or managing the network device 202. In one example, the MM module 204 may detect/determine that the network device 202 may be experiencing some issue such as, but not limited to, the network device 202 being down (i.e., not functioning properly). Responsive to the detected/determined issue, the MM module 204 may generate an alert and/or a report regarding the issue with the network device 202. The alert and/or the report may be provided to the SMS module 206 for resolution and tracking. For example, the resolution may be that the network device 202 is taken offline. Another example may include utilizing a nearby network device (not shown) view the network device 202 to determine the cause of the issue. Another example may include a diagnostic process implemented to determine and correct the issue. Accordingly, a wide variety of methodologies may be utilized to address various issues with the network device 202.

Figure 3:
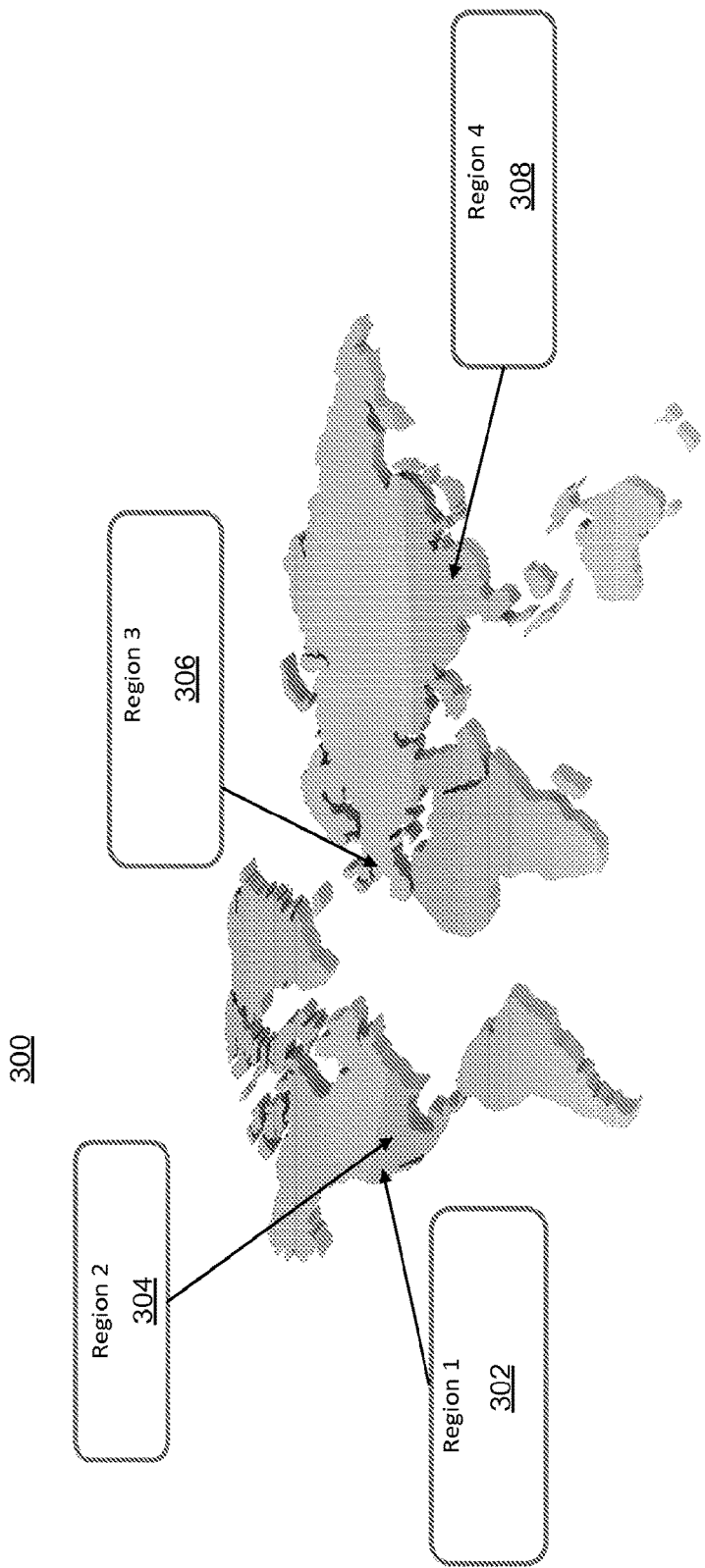
FIG. 3 illustrates an example implementation of various embodiments.

FIG. 3 illustrates an example implementation of various embodiments. As shown in FIG. 3, an example implementation 300 may include various implementations worldwide. For example, the implementation 300 worldwide may include four regions 302, 304, 306, and 308. Region 302 and region 304 may include parts of the Americas, while region 306 may include parts of Europe and Africa and region 308 may include parts of Asia and Australia. As shown in FIG. 3, the various embodiments may be implemented worldwide.

Figure 4:
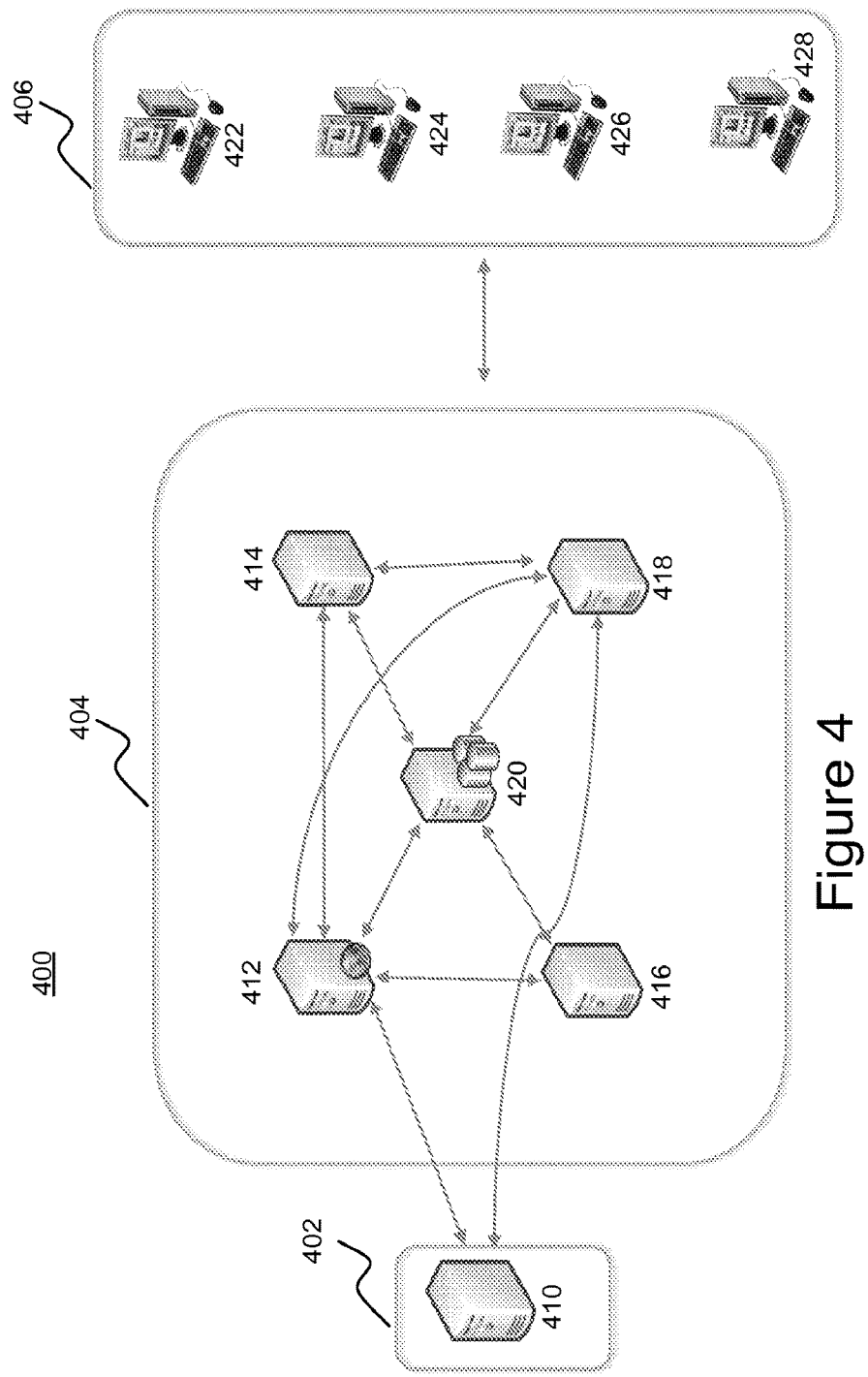
FIG. 4 illustrates a system for monitoring and/or managing network devices, in accordance with various embodiments.

FIG. 4 illustrates a system for monitoring and/or managing network devices, in accordance with various embodiments. In FIG. 4, a system 400 may include a system notification component 402, a system center service management (SCSM) component 404, and an interface component 406. The notification component 402 may include a communication related exchange such as, but not limited to, an exchange 410 configured to be capable of supporting simple mail transfer protocol (SMTP) standard. The SCSM component 404 may include one or more servers for facilitating monitoring and/or management of network devices (e.g., shown in FIGS. 1 and 2). As previously alluded to, the types of servers may include a service manager management server 412, a server configured to be capable of providing services as an orchestrator runbook 414, a service manager data warehouse management server 416, and operations manager management server/report server 418, and a server configured to be capable of supporting structured query language (SQL) 420 for managing data in at least the SCSM component 404 and the notifications component 402.

In the system 400, the interface component 406 may include various client devices such as, but not limited to, a service manager client device 422, a service manager user interface client device 424, an operations manager client device 426, and a client device configured to be capable of providing services as an orchestrator runbook 428.

As shown in FIG. 4, the notification component 402, the SCSM component 404, and the interface component 406 may all be communicatively coupled via a wide variety of networks to each other to facilitate monitoring and/or management of network devices.

It should be pointed out that in FIG. 4, the various components 402, 404, and 406 may be shown with various devices. However, it should be appreciated that the various devices shown in the various components 402, 404, and 406 are but one example and are in no way limiting. For example, the notification component 402 and system center component 404 may be implemented as a single device (i.e., a single server) and need not necessarily have two or more devices. It follows that the interface component 406 may be implemented and configured as a single device. Additionally, it may be contemplated within the scope of the claimed subject matter that the notification component 402, the SCSM component 404, and the interface component 406 may all be configured in a single device, and accordingly, the claimed subject matter is not limited in these respects.

Figure 5:
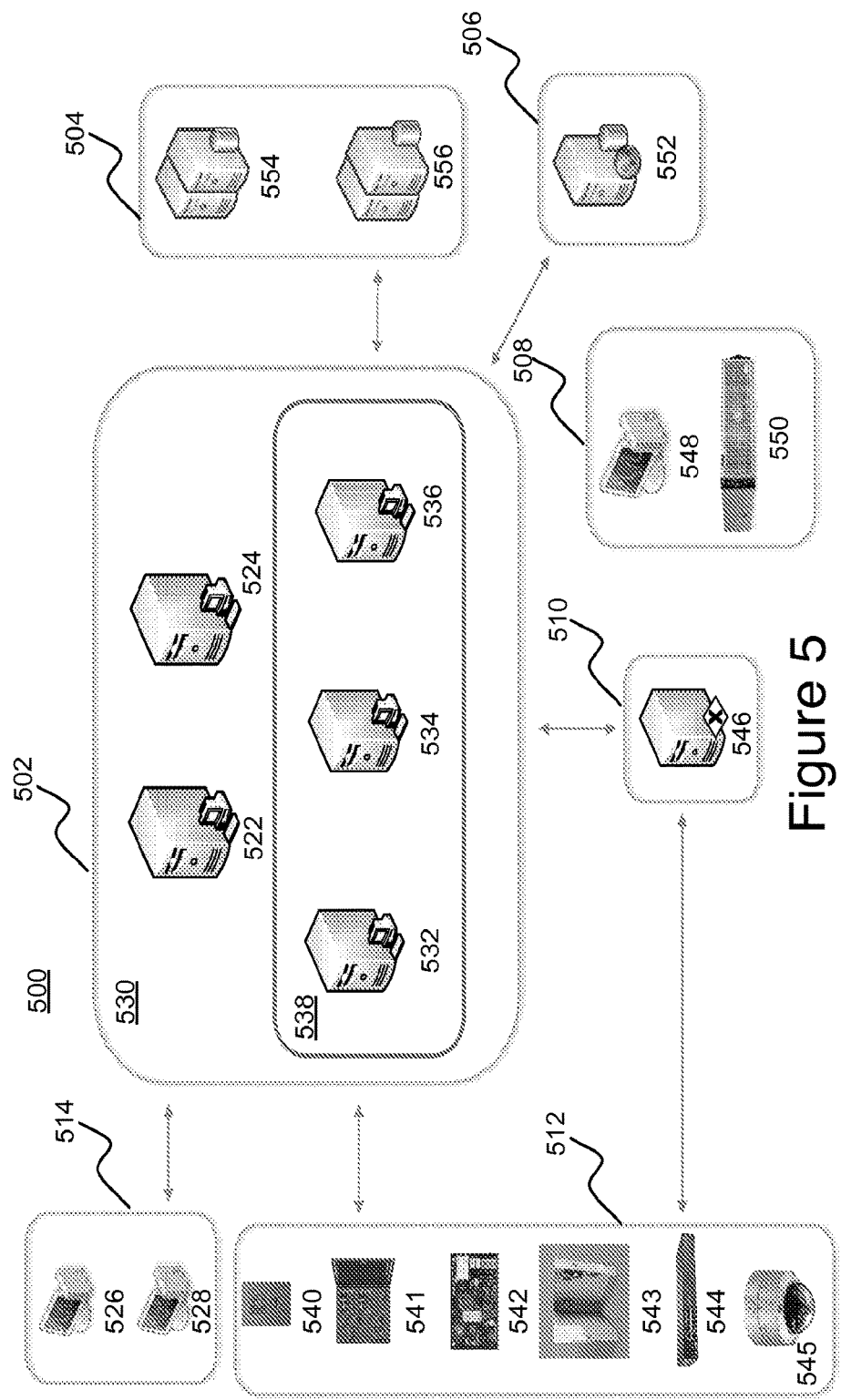
FIG. 5 illustrates a system for monitoring and/or managing network devices, in accordance with various alternative embodiments.

FIG. 5 illustrates a system for monitoring and/or managing network devices, in accordance with various alternative embodiments. In FIG. 5, a system 500 may include a system center operations manager (SCOM) component 502, a database component 504, a reporting component 506, a data recording component 508, a gateway component 510, a network devices component 512, a client device component 514. As previously alluded to, in FIG. 5, the various components 502, 504, 506, 508, 510, 512, and 514 may include various devices. For example, the SCOM component 502 may include one or more management servers 522 and 524 making up a management servers resource pool 530. The client component may include one or more client devices (e.g., an agent managed client device 526 and/or an agentless managed client device 528). Management of the SCOM component 502 may be facilitated by the client component 514 via the one or more client devices 526 and 528.

The SCOM component 502 may include one or more server devices 532, 534, and 536 making up a network devices resource pool 538. As shown, the network devices resource pool 538 may be in communicatively coupled to the network devices component 512 to facilitate monitoring and management of network devices. For illustrative purposes only, the network device component 512 may be shown to include a wide variety of network devices as previously described. For example, the network device component 512 may include network devices such as, but not limited to, Stenofon devices 540, Altronix and Life-Safety Power Supply devices 541, Bosch Security devices 542, Mercury access panel devices 543, Interlogix POE switch 544, and IP surveillance cameras 545.

In FIG. 5, the gateway server component 510 may include a gateway server device 546, which may facilitate storing of data from the network device component 512, namely, one or more network devices 540-545 to the data recording component 508. As shown, data recording component 508 may include various devices such as, but not limited to, a network video recording device 548 and a data storage device array 550. The reporting component 506 may include a reporting server/web client device 552. As previously described, the reporting component 506 may facilitate communication of various status of the network devices 540-545. The database component 504 may include various database related devices such as, but not limited to, data warehouse database device 554 and/or operational database device 556. The database various devices included in the database component 504 may be configured as SQL clusters.

Shown in FIG. 5, the database component 504, the reporting component 506, the data recording component 508, the gateway component 510, the network device component 512, and the client component 514 may all be communicatively coupled to the SCOM component 502 centrally. However, it should be appreciated that the database component 504, the reporting component 506, the data recording component 508, the gateway component 510, the network device component 512, the client component 514, and the SCOM component 502 may be communicatively coupled to each other in a wide variety of manners such as, but not limited to, each other. Additionally, as previously described with respect to FIG. 4, the system 500 may or may not include the various components described without departing from the spirit and scope of the claimed subject matter disclosed. For example, the system 500 may or may not include the database component 504, the reporting component 506, the data recording component 508, the gateway component 510, the network device component 512, and/or the client component 514. That is, the components may be included as a single or limited number of components. It follows that the various devices described in FIG. 5 may or may not all be included. For example, the SCOM component 502 may include a single server device 522, the network component 512 may include a single network device 545, while other component may be omitted entirely (e.g., client component 514 and/or data recording component 508), and so forth.

Figure 6:
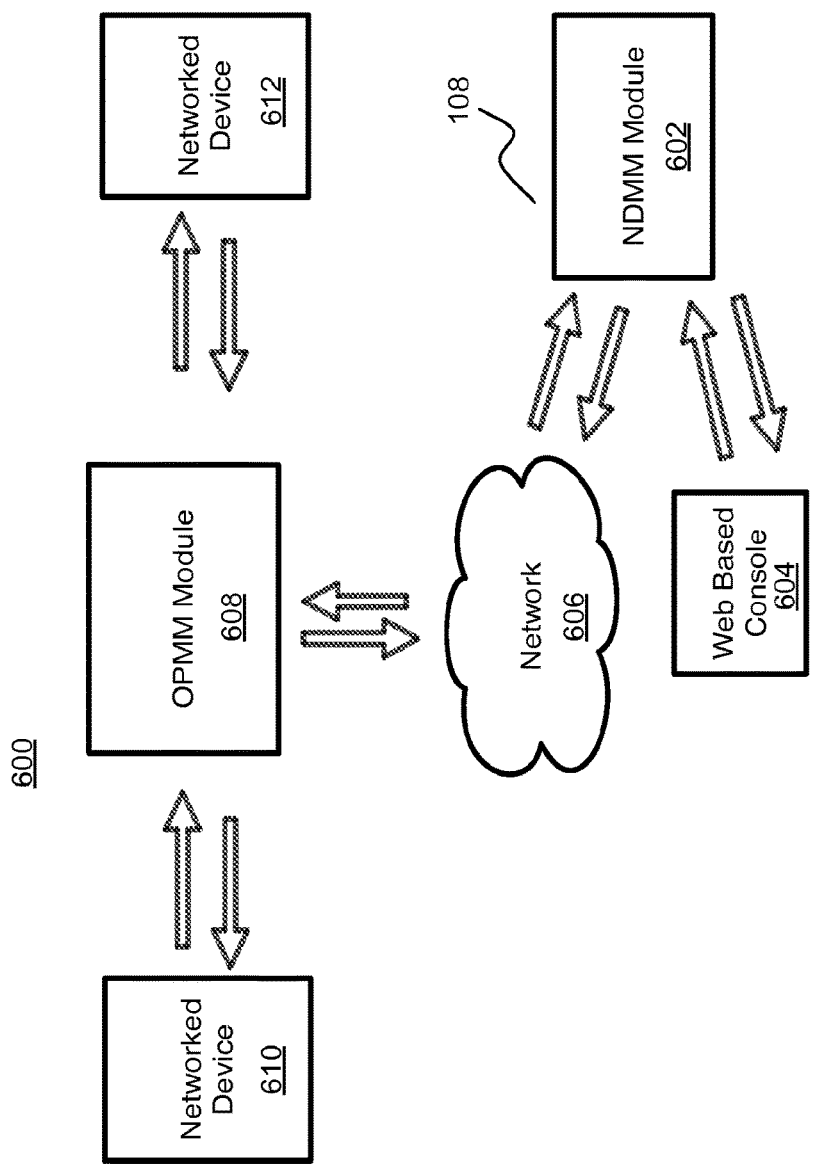
FIG. 6 illustrates a system for monitoring and management of network devices, in accordance with another embodiment.

FIG. 6 illustrates a system for monitoring and management of network devices, in accordance with another embodiment. In FIG. 6, a system 600 may include a network device monitoring and management (NDMM) module 602, a web based console 604, a network 606, a on premise monitoring and management (OPMM) module 608, and one or more network device 610 and 612. Turning briefly to FIG. 1, the NDMM module 602 may have similar functionality as the module 106 shown and described with respect to FIG. 1. The one or more network devices 610 and 612 shown in FIG. 6 may be similar to the network devices 102 and 104 as shown and described with respect to FIG. 1. The same may be said of the network 606 in FIG. 6 as compared to the network as shown and described with respect to FIG. 1. However, in the system shown in FIG. 6, the one or more network devices 610 and 612 may be communicatively coupled to the OPMM module 608, and in turn, the OPMM module 608 may be communicatively coupled to the NDMM module 602 via the network 606.

As described with respect to FIG. 1, the system 600 may be implemented as a cloud based network. For example, the system 600 may include the one or more network devices 610 and 612 NDMM module 602 may be hosted on various cloud based methodologies such as, but not limited to, SAAS methodology, PAAS methodology, IAAS methodology, and/or any combination thereof. Some example network devices may include network storage devices such as, but not limited to, SAN storage devices, NAS devices, POE switch devices, IP based security type network devices (e.g., surveillance cameras, security badge readers, various communication devices), and/or any combination thereof.

The OPMM module 608 shown in FIG. 6 may be configured to be capable of providing secure communication between the one or more network devices 610 and 612 and the NDMM module 602 (i.e., cloud based network). The NDMM module 602 may be configured to be capable of providing information technology service management (ITSM) functionality. For example, the web console 608 being communicatively coupled to the NDMM module 602 may be configured to be capable of providing an interface for a user to view reports, view dashboards, provide status on incident management, provide availability of the one or more network devices 610 and 612, provide various metrics related to the monitoring and management of the one or more network devices 610 and 612, provide metrics and/or analytics related to the system 600, and so forth. Additionally, the NDMM module 602 may facilitate administration of a solution to various issues related to the one or more network devices 610 and 612 and may facilitate tracking of the solution.

It should be appreciated that the above examples of the various environments are described for example purposes only, and accordingly, the claimed subject matter is not limited in these respects. A wide variety of configurations, components, implementations, and/or methodologies may be utilized to monitor and manage a wide variety of network devices in accordance with various embodiments without departing from the scope and spirit of the disclosure, and accordingly, contemplated within the scope of the claimed subject matter.

Figure 7:
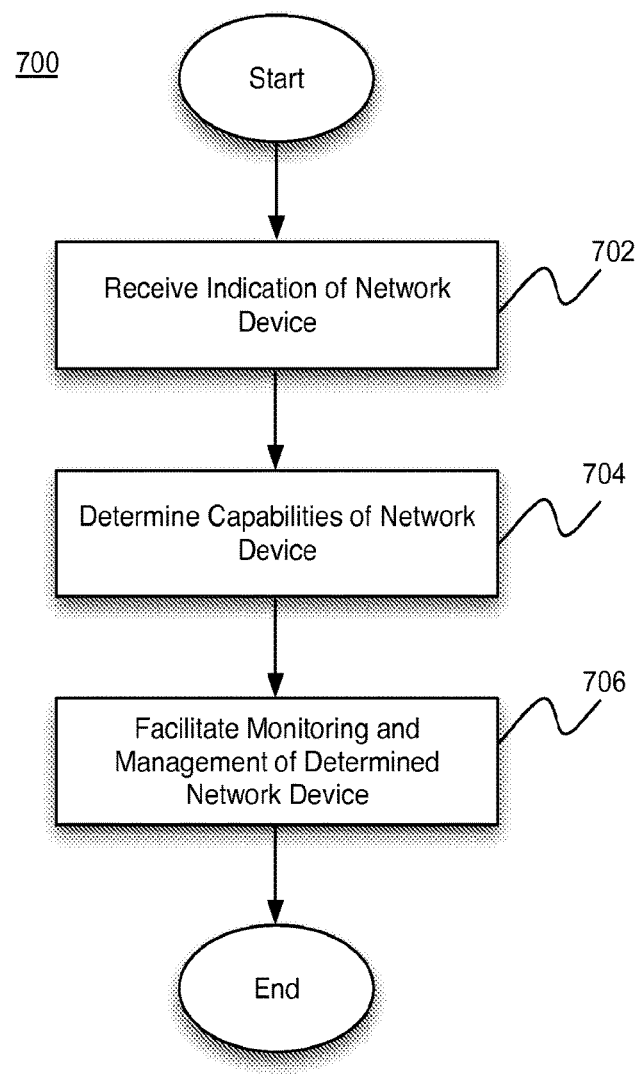
FIG. 7 illustrates an operational flow for monitoring and management of network devices, arranged in accordance with at least some embodiments described herein.

FIG. 7 illustrates an operational flow for monitoring and management of network devices, arranged in accordance with at least some embodiments described herein. In some portions of the description, illustrative implementations of the method are described with reference to elements of the systems 100-600 depicted in FIGS. 1-6. However, the described embodiments are not limited to these depictions. More specifically, some elements depicted in FIGS. 1-6 may be omitted from some implementations of the methods details herein. Furthermore, other elements not depicted in FIGS. 1-6 may be used to implement example methods detailed herein.

Additionally, FIG. 7 employs block diagrams to illustrate the example methods detailed therein. These block diagrams may set out various functional block or actions that may be described as processing steps, functional operations, events and/or acts, etc., and may be performed by hardware, software, and/or firmware. Numerous alternatives to the functional blocks detailed may be practiced in various implementations. For example, intervening actions not shown in the figures and/or additional actions not shown in the figures may be employed and/or some of the actions shown in one figure may be operated using techniques discussed with respect to another figure. Additionally, in some examples, the actions shown in these figures may be operated using parallel processing techniques. The above described, and other not described, rearrangements, substitutions, changes, modifications, etc., may be made without departing from the scope of the claimed subject matter.

In some examples, operational flow 700 may be employed as part of a monitoring and management of network device module. Beginning at block 702 ("Receive Indication of Network device"), the module 106 (shown in FIG. 1) may receive an indication of a network device from a number of network devices. The received indication may be from one or more video devices 102 & 104 shown in FIG. 1.

Continuing from block 702 to 704 ("Determine Capabilities of Network Device"), the module 106 may determine the capabilities network device (e.g., surveillance cameras, security keypads, keycard locks, access badge scanners/readers, etc. including information such as, but not limited to, device model, manufacturer). As previously described, the first and second video devices 102 & 104 may be located in any relation to each other such as, but not limited to, same building or a different part of the globe.

Continuing from block 704 to 706 ("Facilitate Monitoring and Management of Determined Network Device"), the module 106 may facilitate monitoring and management of the network device based at least in part on the determined capabilities of the network device such as, but not limited to, device model, manufacturer, etc. including type of network device.

In general, the operational flow described with respect to FIG. 7 and elsewhere herein may be implemented as a computer program product, executable on any suitable computing system, or the like. For example, a computer program product for facilitating monitoring and management of a network device may be provided. Example computer program products are described with respect to FIG. 8 and elsewhere herein.

FIG. 8 illustrates an example computer program product 800, arranged in accordance with at least some embodiments described herein. Computer program product 800 may include a non-transitory machine readable medium having stored therein instructions that, when executed, cause the machine to facilitate monitoring and management of network devices according to the processes and methods discussed herein. Computer program product 800 may include a signal bearing medium 802. Signal bearing medium 802 may include one or more machine-readable instructions 804, which, when executed by one or more processors, may operatively enable a computing device to provide the functionality described herein. In various examples, some or all of the machine-readable instructions may be used by the devices discussed herein.

In some examples, the machine readable instructions 804 may include receiving data from a number of network devices. In some examples, the machine readable instructions 804 may include monitoring and management of the network devices.

In some implementations, signal bearing medium 802 may encompass a computer-readable medium 806, such as, but not limited to, a hard disk drive, a Compact Disc (CD), a Digital Versatile Disk (DVD), a digital tape, memory, etc. In some implementations, the signal bearing medium 802 may encompass a recordable medium 808, such as, but not limited to, memory, read/write (R/W) CDs, R/W DVDs, etc.

In some implementations, the signal bearing medium 802 may encompass a communications medium 810, such as, but not limited to, a digital and/or an analog communication medium (e.g., a fiber optic cable, a waveguide, a wired communication link, a wireless communication link, etc.). In some examples, the signal bearing medium 802 may encompass a machine readable non-transitory medium.

In general, the methods described with respect to FIG. 7 and elsewhere herein may be implemented in any suitable computing system. Example systems may be described with respect to FIG. 9 and elsewhere herein. In general, the system may be configured to facilitate monitoring and management of network devices.

Figure 9:
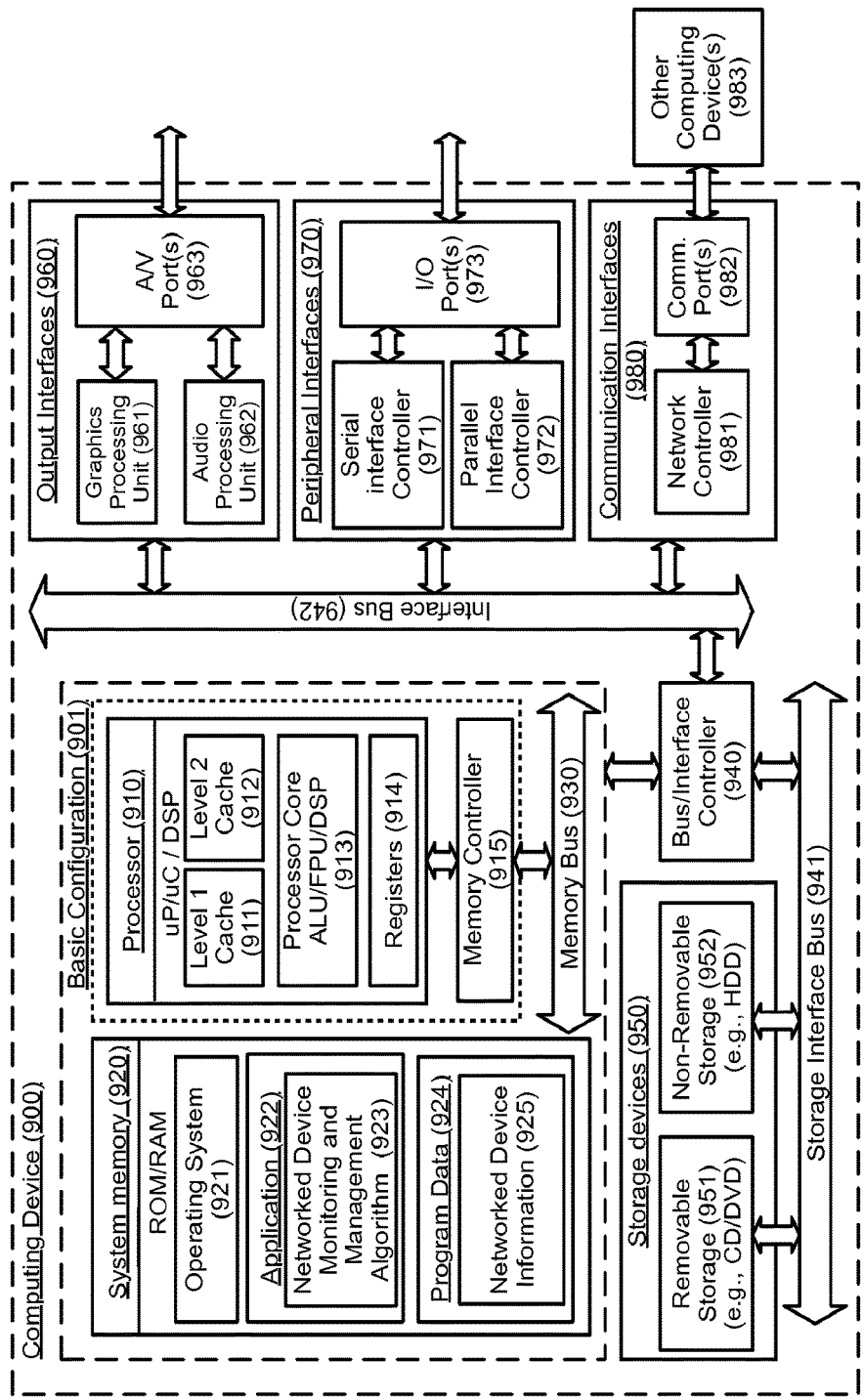
FIG. 9 is an illustration of a block diagram of an example computing device, all arranged in accordance with at least some embodiments described herein.

FIG. 9 is a block diagram illustrating an example computing device 900, such as might be embodied by a person skilled in the art, which is arranged in accordance with at least some embodiments of the present disclosure. In one example configuration 901, computing device 900 may include one or more processors 910 and system memory 920. A memory bus 930 may be used for communicating between the processor 910 and the system memory 920.

Depending on the desired configuration, processor 910 may be of any type including but not limited to a microprocessor (μP), a microcontroller (μC), a digital signal processor (DSP), or any combination thereof. Processor 910 may include one or more levels of caching, such as a level one cache 911 and a level two cache 912, a processor core 913, and registers 914. The processor core 913 may include an arithmetic logic unit (ALU), a floating point unit (FPU), a digital signal processing core (DSP Core), or any combination thereof. A memory controller 915 may also be used with the processor 910, or in some implementations the memory controller 915 may be an internal part of the processor 910.

Depending on the desired configuration, the system memory 920 may be of any type including but not limited to volatile memory (such as RAM), non-volatile memory (such as ROM, flash memory, etc.) or any combination thereof. System memory 920 may include an operating system 921, one or more applications 922, and program data 924. Application 922 may include monitoring and management of network devices algorithm 923 that is arranged to perform the functions as described herein including the functional blocks and/or actions described. Program Data 924 may include network device information 925 for use with the monitoring and management of network devices algorithm 923 such as, but not limited to type of network device (e.g., surveillance cameras, security keypads, keycard locks, access badge scanners/readers, etc.) and/or information such as, but not limited to, device model, manufacturer, etc. In some example embodiments, application 922 may be arranged to operate with program data 924 on an operating system 921 such that implementations of facilitating monitoring and management of network devices may be provided as described herein. For example, apparatus described in the present disclosure may comprise all or a portion of computing device 900 and be capable of performing all or a portion of application 922 such that implementations of facilitating monitoring and management of a network device may be provided as described herein. This described basic configuration is illustrated in FIG. 9 by those components within dashed line 901.

Computing device 900 may have additional features or functionality, and additional interfaces to facilitate communications between the basic configuration 901 and any required devices and interfaces. For example, a bus/interface controller 940 may be used to facilitate communications between the basic configuration 901 and one or more data storage devices 950 via a storage interface bus 941. The data storage devices 950 may be removable storage devices 951, non-removable storage devices 952, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 920, removable storage 951 and non-removable storage 952 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 900. Any such computer storage media may be part of device 900.

Computing device 900 may also include an interface bus 942 for facilitating communication from various interface devices (e.g., output interfaces, peripheral interfaces, and communication interfaces) to the basic configuration 901 via the bus/interface controller 940. Example output interfaces 960 may include a graphics processing unit 961 and an audio processing unit 962, which may be configured to communicate to various external devices such as a display or speakers via one or more A/V ports 963. Example peripheral interfaces 960 may include a serial interface controller 971 or a parallel interface controller 972, which may be configured to communicate with external devices such as input devices (e.g., keyboard, mouse, pen, voice input device, touch input device, etc.) or other peripheral devices (e.g., printer, scanner, etc.) via one or more I/O ports 973. An example communication interface 980 includes a network controller 981, which may be arranged to facilitate communications with one or more other computing devices 990 over a network communication via one or more communication ports 982. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 900 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 900 may also be implemented as a personal computer including both laptop computer and non-laptop computer configurations. In addition, computing device 900 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

Claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a signal bearing medium, a storage medium and/or storage media. This storage media, such as CD-ROMs, computer disks, flash memory, or the like, for example, may have instructions stored thereon, that, when executed by a computing device, such as a computing system, computing platform, or other system, for example, may result in execution of a processor in accordance with claimed subject matter, such as one of the implementations previously described, for example. As one possibility, a computing device may include one or more processing units or processors, one or more input/output devices, such as a display, a keyboard and/or a mouse, and one or more memories, such as static random access memory, dynamic random access memory, flash memory, and/or a hard drive.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A method comprising:

receiving, by a computing device, an indication of a network device;

determining, by the computing device, capabilities of the network device;

determining, by the computing device, if one of the capabilities of the network device is in need of a corrective action;

when it is determined, by the computing device, that one of the capabilities of the network device is in need of corrective action, determining, by the computing device, if an alternate network device is in proximity to the network device, the alternate network device having the same capabilities of the network device;

when the alternative network device is determined to be in proximity, generating, by the computing device, at least one of an alert or a report associated with the network device and the alternate network device, the alert including information regarding the capabilities of the network device and the capabilities of the alternate network device; and utilizing, by the computing device, the alternate network device to confirm and implement the corrective action for the network device, wherein the corrective action includes at least one of fixing the network device or substituting the alternate network device for the network device.

2. The method of claim 1, wherein receiving the indication comprises receiving manufacturer information of the network device.

3. The method of claim 1, wherein receiving the indication comprises receiving an indication of an issue with network device.

4. The method of claim 1, wherein determining capabilities of the network device comprises determining a supported protocol by the network device.

5. The method of claim 1, wherein determining capabilities of the network device comprises flagging the network device.

6. The method of claim 1, wherein determining capabilities of the network device comprises determining a location of the network device.

7. The method of claim 1, wherein determining capabilities of the network device comprises determining if the network device supports simple network management protocol (SNMP).

8. A system comprising:
a network;
a network device communicatively coupled to the network, the network device configured to support a simple network management protocol (SNMP);
a processor communicatively coupled to the network;
a network device monitoring and management module communicatively coupled to the processor and the network; and
a non-transitory machine readable medium having stored therein a plurality of instructions, which, when executed by the processor, operatively enable a computing device to receive an indication of the network device, determine capabilities of the network device, determine if one of the capabilities of the network device is in need of corrective action, when it is determined that one of the capabilities of the network is in need of corrective action, determine if an alternate network device is in proximity to the network device, the network device having the same capabilities of the network device, generate, when the alternative network device is determined to be in proximity, at least one of an alert or a report associated with the network device and the alternate network device, the alert including information regarding the capabilities of the network device and the capabilities of the alternate network device, and utilize the alternate network device to confirm and implement the corrective action for the network device, wherein the corrective action includes at least one of fixing the network device or substituting the alternate network device for the network device.

9. The system of claim 8, wherein the plurality of instructions, which, when executed by the processor, operatively enable a computing device to receive manufacturer information of the network device.

10. The system of claim 8, wherein the plurality of instructions, which, when executed by the processor, operatively enable a computing device to receive an indication of an issue with the network device.

11. The system of claim 8, wherein the plurality of instructions, which, when executed by the processor, operatively enable a computing device to determine a supported protocol by the network device.

12. The system of claim 8, wherein the plurality of instructions, which, when executed by the processor, operatively enable a computing device to flag the network device.

13. The system of claim 8, wherein the plurality of instructions, which, when executed by the processor, operatively enable a computing device to determine a location of the network device.

14. An article of manufacture comprising:
a non-transitory machine readable medium having stored therein a plurality of instructions, which, when executed by a processor, operatively enable a computing device to receive an indication of the network device, determine capabilities of the network device, determine if one of the capabilities of the network device is in need of corrective action, when it is determined that one of the capabilities of the network is in need of corrective action, determine if an alternate network device is in proximity to the network device, the network device having the same capabilities of the network device, generate, when the alternative network device is determined to be in proximity, at least one of an alert or a report associated with the network device and the alternate network device, the alert including information regarding the capabilities of the network device and the capabilities of the alternate network device, and utilize the alternate network device to confirm and implement the corrective action for the network device, wherein the corrective action includes at least one of fixing the network device or substituting the alternate network device for the network device.

15. The article of manufacture of claim 14, the plurality of instructions, which, when executed by a processor, operatively enable a computing device to receive manufacturer information of the network device.

16. The article of manufacture of claim 14, the plurality of instructions, which, when executed by a processor, operatively enable a computing device to receive an indication of an issue with network device.

17. The article of manufacture of claim 14, the plurality of instructions, which, when executed by a processor, operatively enable a computing device to determine a supported protocol by the network device.

18. The article of manufacture of claim 14, the plurality of instructions, which, when executed by a processor, operatively enable a computing device to flag the network device.

19. The article of manufacture of claim 14, the plurality of instructions, which, when executed by a processor, operatively enable a computing device to determine a location of the network device.

20. The article of manufacture of claim 14, the plurality of instructions, which, when executed by a processor, operatively enable a computing device to determine if the network device supports simple network management protocol (SNMP).

* * * * *